(12) United States Patent
Yamamoto et al.

(10) Patent No.: US 9,972,417 B2
(45) Date of Patent: May 15, 2018

(54) ELECTRICALLY CONDUCTING PATH

(71) Applicant: Sumitomo Wiring Systems, Ltd., Yokkaichi, Mie (JP)

(72) Inventors: Hironobu Yamamoto, Mie (JP); Toshinari Kobayashi, Mie (JP); Masaharu Nakamura, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days. days.

(21) Appl. No.: 15/346,238

(22) Filed: Nov. 8, 2016

(65) Prior Publication Data
US 2017/0154706 A1    Jun. 1, 2017

(30) Foreign Application Priority Data
Nov. 26, 2015 (JP) .................... 2015-230726

(51) Int. Cl.
*H02G 3/04* (2006.01)
*H01B 7/285* (2006.01)
*H01B 7/282* (2006.01)
*B60R 16/02* (2006.01)

(52) U.S. Cl.
CPC ........... *H01B 7/285* (2013.01); *H01B 7/2825* (2013.01); *B60R 16/0215* (2013.01); *Y02A 30/14* (2018.01)

(58) Field of Classification Search
CPC . H01B 7/00; H01B 7/18; H01B 7/282; H01B 7/285; H01B 7/009; H01B 7/0045; H01B 7/02; H01B 7/2825; H01R 25/00; H01R 25/003; H02G 1/14; H02G 1/145; H02G 1/16; Y02A 30/14; B60R 16/0215

USPC ....... 174/68.1, 68.3, 84 R, 70 C, 23 R, 23 C, 174/24, 60, 72 A; 439/204, 865, 866; 248/68.1, 49
See application file for complete search history.

(56) References Cited

U.S. PATENT DOCUMENTS

| | | | | |
|---|---|---|---|---|
| 3,777,048 A | * | 12/1973 | Traut ................... | H02G 15/184 174/84 R |
| 3,872,233 A | * | 3/1975 | Rocton .................. | H02G 15/24 174/23 R |
| 4,461,736 A | * | 7/1984 | Takagi ................. | H02G 15/003 174/23 C |
| 4,601,536 A | * | 7/1986 | Guazzo ................ | G02B 6/4417 174/70 R |

(Continued)

FOREIGN PATENT DOCUMENTS

JP    2004-179040 A    6/2004

*Primary Examiner* — Angel R Estrada
(74) *Attorney, Agent, or Firm* — Dinsmore & Shohl LLP

(57) ABSTRACT

An electrically conducting path including: an electrical wire; an exterior member made of rubber and enclosing a portion of the electrical wire; a waterproof member filling a gap between an opening part of an end portion of the exterior member and the electrical wire; and a molded resin member that is in intimate contact with and covers, in a liquid-tight state, an outer circumferential surface of the end portion of the exterior member, the waterproof member, and a section of the electrical wire that is exposed to an outside of the exterior member. Since the gap between the opening part of the end portion of the exterior member and the electrical wire is sealed in a liquid-tight state by the waterproof member and the molded resin member, it is possible to prevent water from entering the inside of the exterior member.

14 Claims, 9 Drawing Sheets

(56) References Cited

U.S. PATENT DOCUMENTS

| | | | |
|---|---|---|---|
| 6,225,562 B1* | 5/2001 | Fujishita | H02G 15/04 |
| | | | 174/152 G |
| 6,613,263 B2* | 9/2003 | Kondo | H01R 4/70 |
| | | | 264/263 |
| 8,399,766 B2* | 3/2013 | Hane | H01R 13/53 |
| | | | 174/84 R |
| 8,723,040 B2* | 5/2014 | Sakura | H01R 4/185 |
| | | | 174/68.1 |
| 8,927,863 B2* | 1/2015 | Tanikawa | H02G 15/04 |
| | | | 174/74 A |
| 9,065,261 B2* | 6/2015 | Kawamura | H02G 3/0406 |

* cited by examiner

ELECTRICALLY CONDUCTING PATH

CROSS-REFERENCE TO RELATED APPLICATIONS

This application claims priority of Japanese Patent Application No. JP2015-230726 filed Nov. 26, 2015.

FIELD OF THE INVENTION

The present invention relates to an electrically conducting path.

BACKGROUND

JP 2004-179040A discloses an electrically conducting path provided with an electrical wire and a rubber boot that encloses an end portion of the electrical wire. A section of the electrical wire other than the end portion is led out of an opening part of an end portion of the rubber boot and is thus exposed to the outside. In order to prevent a gap from being created between the opening part of the rubber boot and the electrical wire, an adhesive tape is wound around a section spaning the end portion of the rubber boot and an exterior rubber hose that protects the electrical wire. Since the adhesive tape is wound around the section, the rubber boot and the exterior rubber hose are prevented from being displaced. With this configuration, a waterproof rubber plug of a connector part is prevented from directly getting wet, and an insulator part of an electrical wire protected by the exterior rubber hose is prevented from being damaged by chippings such as pieces of stone that fly off.

JP 2004-179040A is an example of related art.

SUMMARY OF THE INVENTION

A waterproofing means using a wound adhesive tape does not satisfactorily achieve the function of fixing the rubber boot and the rubber hose that prevent the waterproof rubber from directly getting wet because the adhesive tape has the risk of coming off when the waterproofing means is used in an environment in which the adhesive tape is likely to be exposed to a large amount of water such as in a wheel house of a vehicle.

The present invention has been made in view of the above-described situation, and aims to prevent an exterior member made of rubber from being displaced.

An electrically conducting path according to one aspect of the present invention includes:

an electrical wire;

an exterior member made of rubber and enclosing a portion of the electrical wire; and a molded resin member that is in intimate contact with and covers, in a liquid-tight state, an outer circumferential surface of an end portion of the exterior member and a section of the electrical wire that is exposed to an outside of the exterior member.

With this configuration, the molded resin member is in intimate contact (e.g. areal contact) with the outer circumferential surfaces of the end portion of the exterior member and the section of the electrical wire that is exposed to the outside of the exterior member. Therefore, it is possible to prevent the exterior member from being displaced relative to the electrical wire. Also, the gap between the opening part of the end portion of the exterior member and the electrical wire is sealed in a liquid-tight state by the molded resin member. Therefore, it is possible to prevent water from entering the inside of the exterior member.

DETAILED DESCRIPTION OF THE PREFERRED EMBODIMENTS

Figure 1:
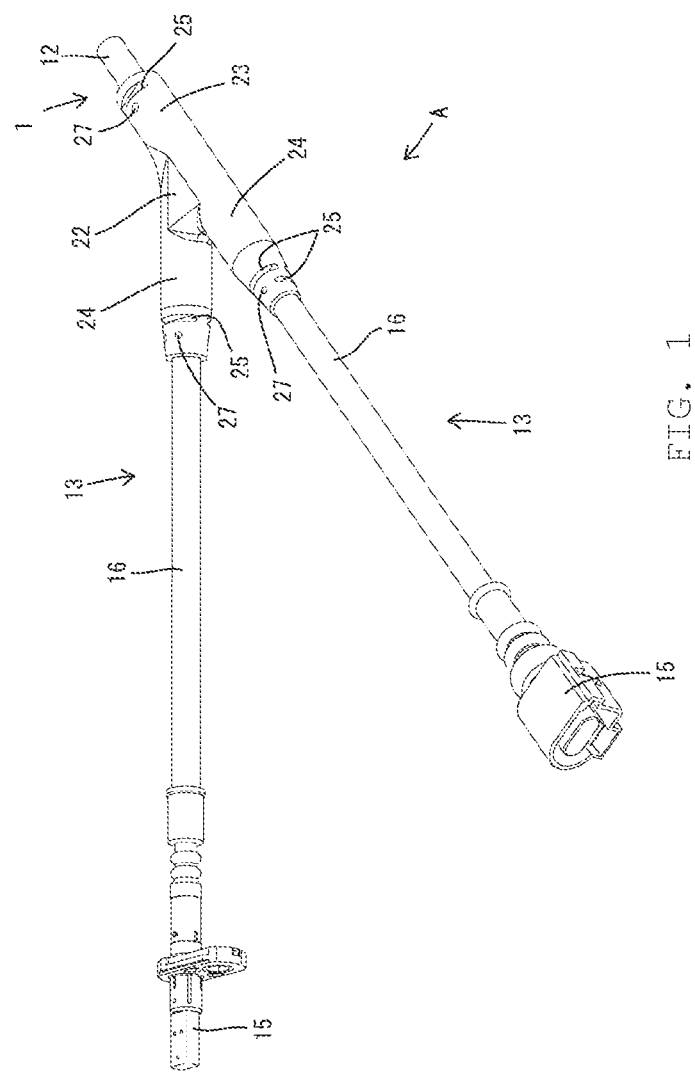
FIG. 1 is a perspective view of an electrically conducting path according to a first embodiment.
Figure 2:
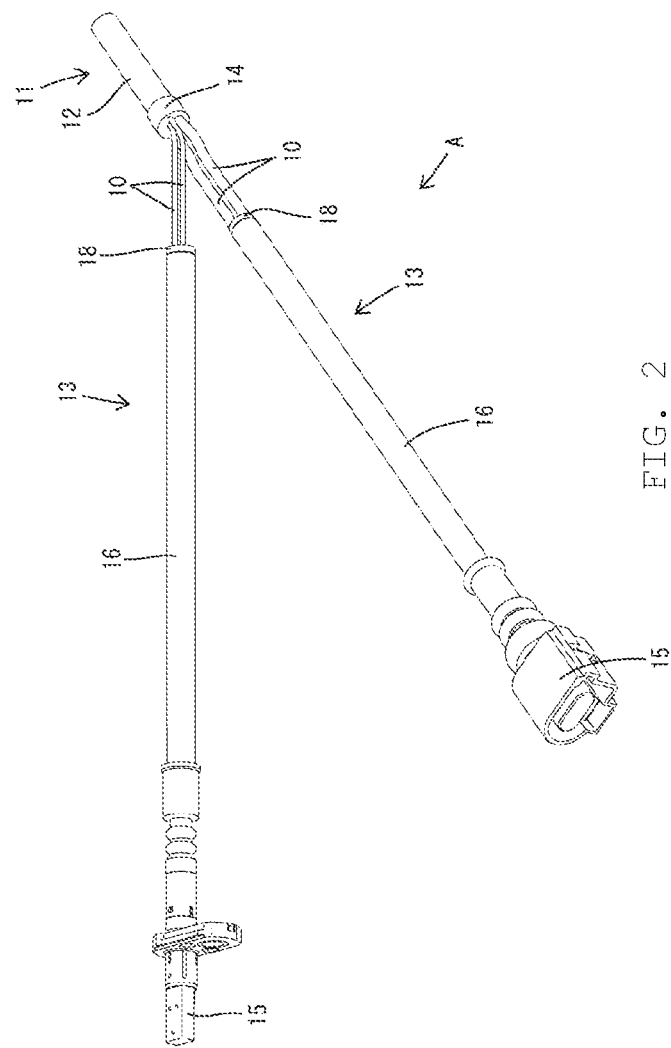
FIG. 2 is a perspective view showing a situation in which a resin member to be molded has not been formed.
Figure 3:
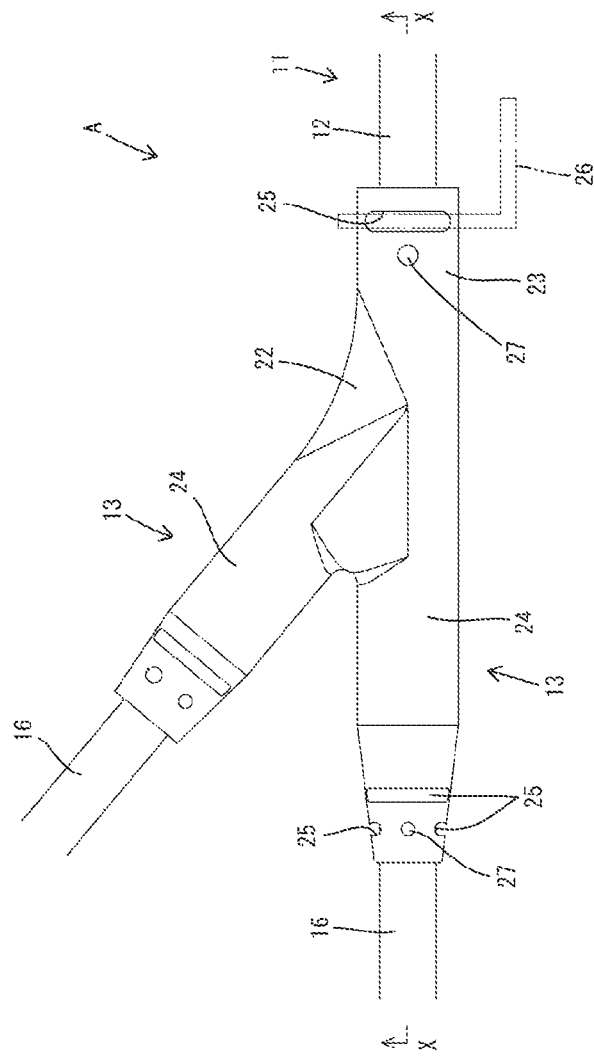
FIG. 3 is a plan view showing a portion of an electrically conducting path on which the molded resin member has been formed.
Figure 4:
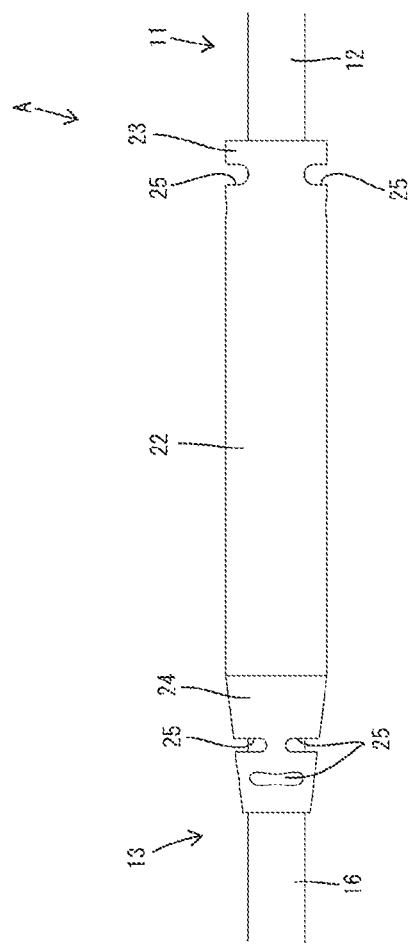
FIG. 4 is a side view showing the portion of the electrically conducting path on which the molded resin member has been formed.
Figure 5:
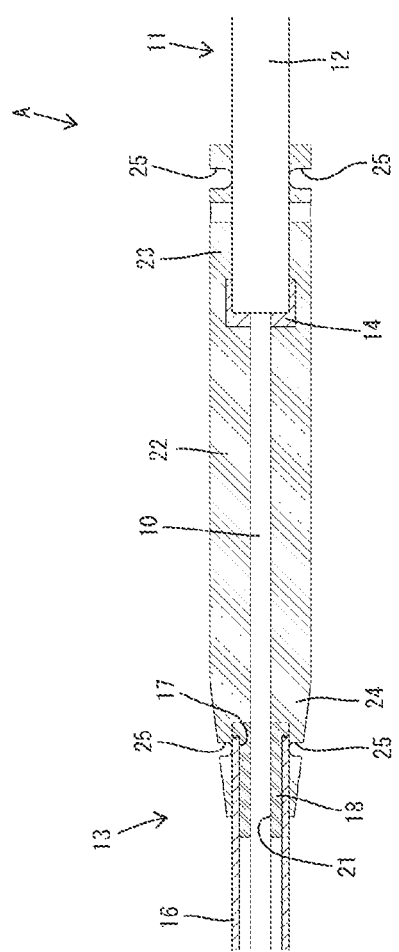
FIG. 5 shows a cross-section along a line X-X shown in FIG. 3.
Figure 6:
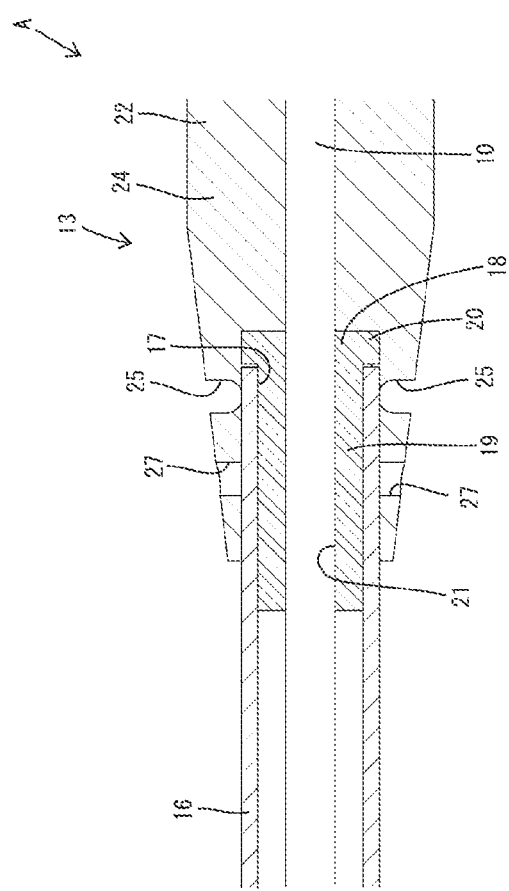
FIG. 6 is an enlarged cross-sectional view showing a portion shown in FIG. 5.

The electrically conducting path according to an aspect of the present invention may further include a waterproof member filling a gap between an opening part of an end portion of the exterior member and the electrical wire, and the molded resin member may be in intimate contact with the waterproof member in a liquid-tight state. With this configuration, it is possible to reliably prevent water from entering the inside of the exterior member, using the waterproof member.

The electrically conducting path according to another aspect of the present invention may further include a reinforcing part that is formed on the waterproof member and that is in contact with an inner circumferential surface of the exterior member. With this configuration, it is possible to reliably bring the exterior member and the molded resin member into intimate contact with each other by preventing the exterior member from deforming at the time of forming the molded resin member by injection molding.

In the electrically conducting path according to another aspect of the present invention, a plurality of the electrical wires may be provided, and the plurality of electrical wires may be bundled together and included in a main path, the plurality of electrical wires may be divided into a plurality of branch paths, a plurality of exterior members may be provided, each of the plurality of exterior members enclosing one of the plurality of branch paths, and the molded resin member may be a single member that covers and thereby integrates the plurality of branch paths and the plurality of exterior members into one piece. With this configuration, it is possible to fix the directions in which the plurality of branch paths are routed, using the molded resin member.

In the electrically conducting path according to another aspect of the present invention, the plurality of electrical wires included in the main path may be embedded in a sheath, the branch paths may respectively include sections of the electrical wires that are exposed to an outside of the sheath, and the molded resin member may cover, in a liquid-tight state, sections of the branch paths and an outer circumferential surface of the sheath, the sections of the branch paths being exposed to an outside of the exterior members. With this configuration, it is possible to protect the whole exposed sections of the electrical wires that are not enclosed by the exterior members or the sheath, using the resin molding member.

In the electrically conducting path according to another aspect of the present invention, connectors may be respectively attached to an end portion of the main path and end portions of the plurality of branch paths.

The electrically conducting path according to another aspect of the present invention may further include an attachment part that is formed on an outer circumferential surface of the molded resin member and is configured to allow another member to be attached to the attachment part. With this configuration, it is possible to provide the molded resin member with multiple functions.

First Embodiment

The following describes a first embodiment of the present invention with reference to FIGS. 1 to 9. An electrically conducting path A according to the first embodiment includes: one main path 11 (FIG. 2); two branch paths 13 that branch off from a front end portion (the end portion on the left side in FIG. 2) of the main path 11; two exterior members 16; two waterproof members 18; and one molded resin member 22. In the following description the left side and the right side in FIGS. 1 to 9 are respectively defined as a front end side and a base end side.

The main path 11 is constituted by a plurality of electrical wires 10 that are all embedded together in a sheath 12 made of synthetic resin. The electrical wires 10 are in a well-known form, in each of which a conductor is enclosed by insulating coating. The front end portions of the plurality of electrical wires 10 are exposed to the outside from the front end surface of the sheath 12, and constitute the two branch paths 13. A cap 14 (FIG. 2), through which the electrical wires 10 penetrate, is attached to the front end portion of the sheath 12. Each branch path 13 is constituted by a bundle of electrical wires 10, and a connector 15 is attached to the front end portion of each branch path 13. The connectors 15 are connected to a wire harness (not shown) of a terminal fitting or an apparatus (not shown), for example. A connector (not shown) is attached to the end portion of the main path 11 on the side opposite to the branch paths 13 as well.

Front end-side sections (the connector 15 side sections) of the branch paths 13 are respectively enclosed with the exterior members 16. The exterior members 16 are made of rubber, and each have an approximately cylindrical shape. The inner diameter of the exterior members 16 is larger than the outer diameter of the bundles of electrical wires 10 that constitute the branch paths 13. Sections of the electrical wires 10 on the base end side of the branch paths 13 are not embedded in the sheath 12, and thus constitute exposed sections that are not enclosed with the exterior members 16. The exposed sections of the two branch paths 13 are positioned to join together in the vicinity of the front end portion of the sheath 12.

The waterproof members 18 are made of synthetic resin, and each have a columnar shape overall. Each waterproof member 18 is a member that seals the gap between an opening part 17 of the base end portion (the end portion on the right side in FIGS. 5 and 6) of the corresponding exterior member 16 and electrical wires 10. In each waterproof member 18, the columnar portion that constitutes a large part on the front end side serves as a reinforcing part 19. The outer diameter of the reinforcing parts 19 is equal to or slightly larger than the inner diameter of the exterior members 16. Also, the base end portion of each waterproof member 18 is provided with a flange part 20 having a circular shape that is concentric with the corresponding reinforcing part 19 and has a diameter that is larger than the diameter of the reinforcing part 19. The outer diameter of the flange parts 20 is approximately equal to the outer diameter of the exterior members 16.

Each waterproof member 18 is provided with insertion holes 21 whose number is equal to the number of electrical wires 10 that constitute the corresponding branch path 13. The insertion holes 21 penetrate through the waterproof member 18 in parallel with the axis of the waterproof member 18. The insertion holes 21 each have a circular cross section, and their inner diameter is approximately equal to the outer diameter of an electrical wire 10. Each waterproof member 18 is attached to the corresponding branch path 13 by inserting the electrical wires 10 into the insertion holes 21. The waterproof members 18 are respectively attached to the base end portions of the exterior members 16 fitted onto the branch paths 13. In the attached state, the reinforcing parts 19 are respectively fitted into the opening parts 17 of the exterior members 16, and thus the base end portions of the exterior members 16 are restricted from deforming inward in the radial direction and reducing the dimeter. The end surfaces of the base end portions of the exterior members 16 are brought into contact with the flange parts 20, and thus the exterior members 16 and the waterproof members 18 are positioned in terms of the axial direction of the exterior members 16 and the waterproof members 18.

The molded resin member 22 is a single member that is molded and integrated with the front end portion of the main path 11, the base end portions of the two branch paths 13, the two waterproof members 18, and the base end portions of the two exterior members 16. In other words, the front end portion of the main path 11, the whole bodies of the two branch paths 13, the two waterproof members 18, and the base end portions of the two exterior members 16 are embedded in the molded resin member 22. The section of the molded resin member 22 in which the front end portion of the main path 11 is embedded serves as a main path enclosure 23. The sections of the molded resin member 22 in which the base end portions of the branch paths 13 are embedded serve as branch enclosures 24.

The molded resin member 22 is made of synthetic resin, and therefore has the property of maintaining its shape. The two branch enclosures 24 extend in two ways from the front end portion of the main path enclosure 23. The molded resin member 22 has approximately the shape of "y" in plan view. The base end portions of the two branch paths 13 embedded in the branch enclosures 24 are positioned so as to be routed toward different directions with a predetermined branching angle formed between them.

The molded resin member 22 is in intimate contact with: the outer circumferential surface of the front end portion of the main path 11 (the sheath 12); the outer circumferential surfaces of the base end portions of the two branch paths 13 (the electrical wires 10); the outer circumferential surfaces and the base end-side end surfaces of the flange parts 20 of the waterproof members 18; and the outer circumferential surfaces of the base end portions of the exterior members 16, in a watertight state. Therefore, even when the outer surface of the molded resin member 22 is exposed to high-pressure water, there is no risk of the water intruding between the molded resin member 22 and the exterior members 16 or between the molded resin member 22 and the sheath 12.

A plurality of attachment parts 25 each having a groove shape are formed in the outer circumferential surface of the molded resin member 22. The attachment parts 25 are formed in the base end portion of the molded resin member 22 and in the two branching front end portions of the molded resin member 22. These attachment parts 25 are configured such that, for example, brackets 26 ("another member" recited in claims) for fixing the molded resin member 22 to the body or the like of a vehicle can be attached to the attachment parts 25. Also, a plurality of molded holes 27 are formed in the outer circumferential surface of the molded resin member 22. The molded holes 27 correspond to the positions at which positioning pins 32 provided in a mold 30 were located when molding was performed.

Figure 7:
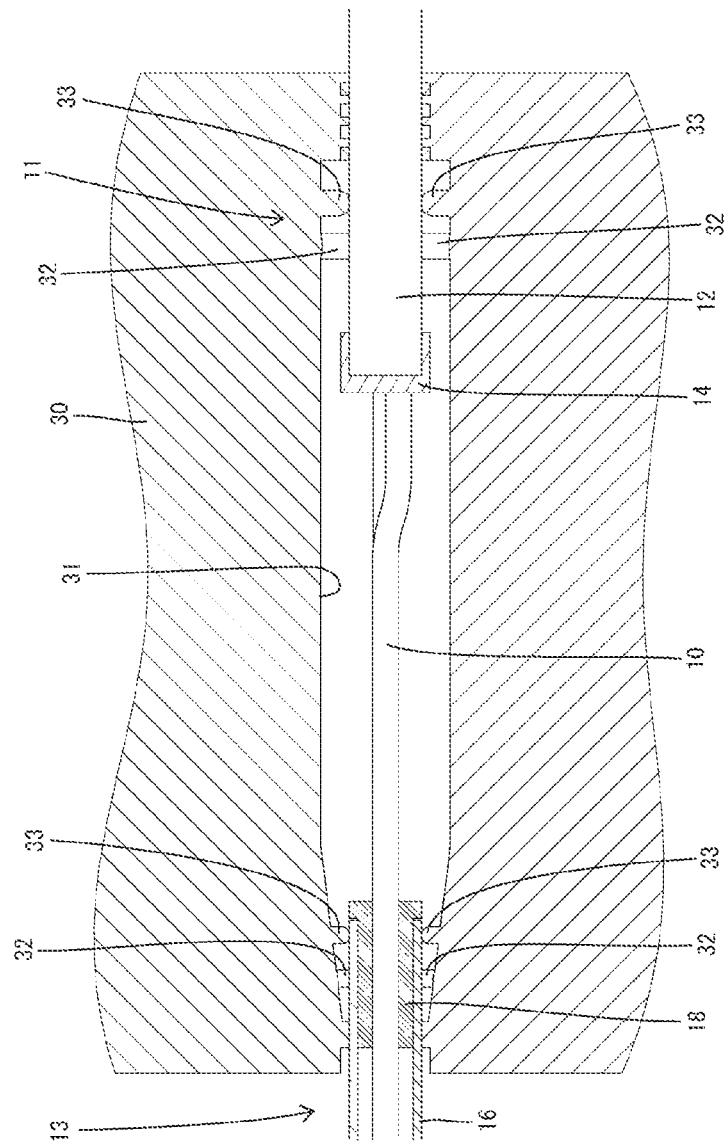
FIG. 7 is a cross-sectional view showing a mold.
Figure 8:
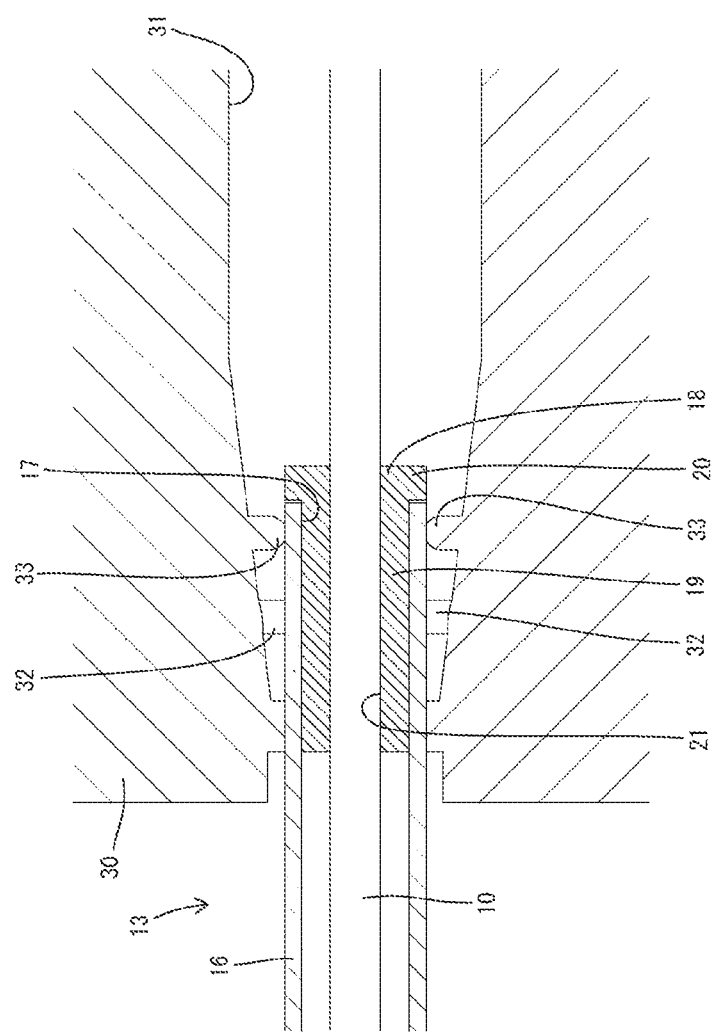
FIG. 8 is a cross-sectional view showing an exterior member-side area of the mold.
Figure 9:
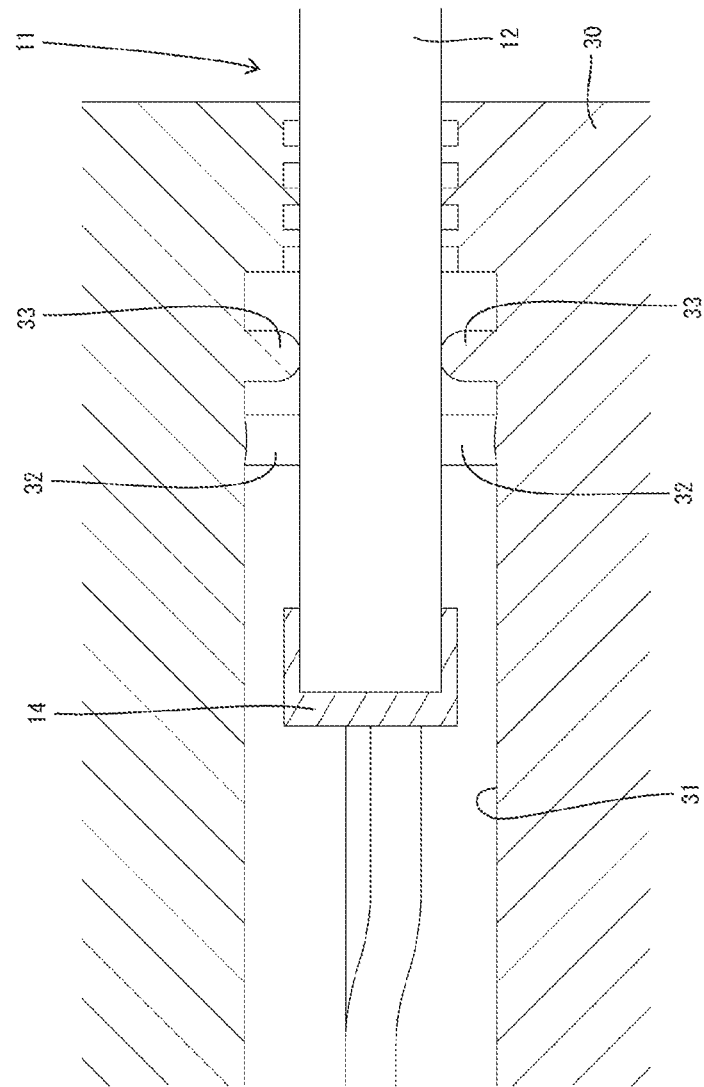
FIG. 9 is a cross-sectional view showing a sheath-side area of the mold.

Next, the mold 30 for forming the molded resin member 22 is described. As shown in FIGS. 7 to 9, a cavity 31 for molding the molded resin member 22 is formed in the mold 30. The plurality of positioning pins 32 described above protrude within the cavity 31. The protruding ends of the positioning pins 32 come into contact with the outer circumferential surface of the front end portion of the sheath 12 and the outer circumferential surfaces of the base end portions of the exterior members 16, and position the front end portion of the sheath 12 and the base end portions of the exterior members 16 in terms of the radial direction. Also, protruding molding portions 33 for forming the attachment parts 25 are provided within the cavity 31.

Molten resin is injected into the cavity 31 of the mold 30 and is cooled, and thus the resin solidifies. Consequently, the molded resin member 22 is molded into a predetermined shape, in which the molded resin member 22, the sheath 12, the exterior members 16, the electrical wires 10, and the waterproof members 18 are integrated in intimate contact with each other. The electrical wires 10 and the exterior member 16 are thus restricted from moving in the axial direction (the lengthwise direction of the electrical wires 10) relative to each other.

As described above, the electrically conducting path A according to the present embodiment includes: the electrical wires 10; the exterior members 16 made of rubber and enclose portions of the electrical wires 10; the waterproof members 18 that fill the gaps between the opening parts 17 of the base end portions of the exterior members 16 and the electrical wires 10; and the molded resin member 22 that is in intimate contact with, and covers, the outer circumferential surfaces of the base end portions of the exterior members 16, the waterproof members 18, and sections of the electrical wires 10 that are exposed to the outside of the exterior members 16, in a liquid-tight state. With this configuration, the molded resin member 22 is in intimate contact with the outer circumferential surfaces of the end portions of the exterior members 16 and the sections of the electrical wires 10 that are exposed to the outside of the exterior members 16, and it is possible to prevent the exterior members 16 from being displaced in the axial direction relative to the electrical wires 10. Also, the gaps between the opening parts 17 of the base end portions of the exterior members 16 and the electrical wires 10 are sealed in a liquid-tight state by the waterproof members 18 and the molded resin member 22. Therefore, it is possible to prevent water from entering the inside of the exterior members 16.

The molded resin member 22 is formed by injection molding using the mold 30, and therefore there is a concern that the base end portions of the exterior members 16 deform and reduce their diameters due to the injection pressure. However, the waterproof members 18 are each provided with the reinforcing part 19 that is in contact with the inner circumferential surface of the corresponding exterior member 16. Therefore, it is possible to prevent the exterior members 16 from deforming and reducing their diameters. Consequently, it is possible to reliably bring the exterior members 16 and the molded resin member 22 into intimate contact with each other. Also, the attachment parts 25 for attaching the brackets 26 are formed on the outer circumferential surface of the molded resin member 22. The molded resin member 22 is thus configured as a multi-functional component.

The electrically conducting path A includes: the main path 11 constituted by a plurality of electrical wires 10 grouped together; and two branch paths 13 constituted by dividing the plurality of electrical wires 10 into two branches. The two exterior members 16 respectively enclose the two branch paths 13. The molded resin member 22 is configured as a single member that covers and thereby integrates the two branch paths 13 and the two exterior members 16 into one piece. With this configuration, it is possible to fix the directions in which the two branch paths 13 are routed, using the molded resin member 22.

The main path 11 is formed by embedding a plurality of electrical wires 10 in the sheath 12, and the branch paths 13 are constituted by the sections of the electrical wires 10 that are exposed to the outside of the sheath 12. The resin molding member 22 covers the sections of the two branch paths 13 that are exposed to the outside of the exterior members 16, and the outer circumferential surface of the front end portion of the sheath 12, in a liquid-tight state. With this configuration, it is possible to protect the whole exposed sections of the electrical wires 10 that are not enclosed by the exterior members 16 or the sheath 12, using the resin molding member 22.

Other Embodiments

The present invention is not limited to the description above or the embodiments described with reference to the drawings, and the following embodiments are also included in the technical scope of the present invention, for example.

(1) In the above-described embodiment, the waterproof members are provided with the reinforcing parts. However, it is also possible that the waterproof members are not provided with the reinforcing parts.

(2) In the above-described embodiment, the molded resin member covers the whole exposed sections of the electrical wires. However, the molded resin member may cover only portions that are close to the exterior members, out of the exposed sections of the electrical wires.

(3) In the above-described embodiment, the molded resin member is configured as a single member that covers and thereby integrates the plurality of branch paths and the plurality of exterior members into one piece. However, it is also possible to cover the plurality of branch paths and the plurality of exterior members with separate molded resin members.

(4) In the above-described embodiment, the attachment parts to which brackets ("another member") can be attached are formed on the outer circumferential surface of the molded resin member. However, it is also possible that the molded resin member is not provided with such attachment parts.

(5) In the above-described embodiment, the front end portion of the sheath that constitutes the main path is covered by the molded resin member. However, it is possible that the outer circumferential surface of the front end portion of the sheath is not covered by the molded resin member.

(6) In the above-described embodiment, the electrically conducting path including two branch paths was described. However, the number of branch paths may be three or more.

(7) In the above-described embodiment, the outer diameter of the flange parts is approximately equal to the outer diameter of the exterior members. However, the outer diameter of the flange parts may be larger than the outer diameter of the exterior members, and may also be smaller than the outer diameter of the exterior members.

(8) In the above-described embodiment, the exterior members enclose the branch paths. However, the present invention is also applicable to an electrically conducting path that does not include branch paths.

(9) In the above-described embodiment, the electrically conducting path is provided with waterproof members. However, according to the present invention, it is also possible that the waterproof members are not provided.

What is claimed is:

1. An electrically conducting path comprising:
   an electrical wire;
   an exterior member made of rubber and enclosing a portion of the electrical wire;
   a waterproof member filling a gap between an opening part of an end portion of the exterior member and the electrical wire; and
   a molded resin member that is in intimate contact with and covers, in a liquid-tight state, an outer circumferential surface of an end portion of the exterior member and a section of the electrical wire that is exposed to an outside of the exterior member, and wherein the molded resin member is also in intimate contact with the waterproof member in a liquid-tight state.

2. The electrically conducting path according to claim 1, further comprising
   a reinforcing part that is formed on the waterproof member and is in contact with an inner circumferential surface of the exterior member.

3. The electrically conducting path according to claim 1, wherein a plurality of the electrical wires are provided, and the plurality of electrical wires are bundled together and included in a main path,
   the plurality of electrical wires are divided into a plurality of branch paths,
   a plurality of the exterior members are provided, each of the plurality of exterior members enclosing one of the plurality of branch paths, and
   the molded resin member is a single member that covers and thereby integrates the plurality of branch paths and the plurality of exterior members into one piece.

4. The electrically conducting path according to claim 3, the plurality of electrical wires included in the main path are embedded in a sheath,
   the branch paths respectively include sections of the electrical wires that are exposed to an outside of the sheath, and
   the molded resin member covers, in a liquid-tight state, sections of the branch paths and an outer circumferential surface of the sheath, the sections of the branch paths being exposed to an outside of the exterior members.

5. The electrically conducting path according to claim 3, wherein connectors are respectively attached to an end portion of the main path and end portions of the plurality of branch paths.

6. The electrically conducting path according to claim 1, further comprising:
   an attachment part that is formed on an outer circumferential surface of the molded resin member and is configured to allow another member to be attached to the attachment part.

7. The electrically conducting path according to claim 1, wherein a plurality of the electrical wires are provided, and the plurality of electrical wires are bundled together and included in a main path, the plurality of electrical wires are divided into a plurality of branch paths, a plurality of the exterior members are provided, each of the plurality of exterior members enclosing one of the plurality of branch paths, and the molded resin member is a single member that covers and thereby integrates the plurality of branch paths and the plurality of exterior members into one piece.

8. The electrically conducting path according to claim 2, wherein a plurality of the electrical wires are provided, and the plurality of electrical wires are bundled together and included in a main path, the plurality of electrical wires are divided into a plurality of branch paths, a plurality of the exterior members are provided, each of the plurality of exterior members enclosing one of the plurality of branch paths, and the molded resin member is a single member that covers and thereby integrates the plurality of branch paths and the plurality of exterior members into one piece.

9. The electrically conducting path according to claim 4, wherein connectors are respectively attached to an end portion of the main path and end portions of the plurality of branch paths.

10. The electrically conducting path according to claim 1, further comprising an attachment part that is formed on an outer circumferential surface of the molded resin member and is configured to allow another member to be attached to the attachment part.

11. The electrically conducting path according to claim 2, further comprising an attachment part that is formed on an outer circumferential surface of the molded resin member and is configured to allow another member to be attached to the attachment part.

12. The electrically conducting path according to claim 3, further comprising an attachment part that is formed on an outer circumferential surface of the molded resin member and is configured to allow another member to be attached to the attachment part.

13. The electrically conducting path according to claim 4, further comprising an attachment part that is formed on an outer circumferential surface of the molded resin member and is configured to allow another member to be attached to the attachment part.

14. The electrically conducting path according to claim 5, further comprising an attachment part that is formed on an outer circumferential surface of the molded resin member and is configured to allow another member to be attached to the attachment part.

* * * * *